United States Patent [19]

Barlow et al.

[11] Patent Number: 5,193,181
[45] Date of Patent: Mar. 9, 1993

[54] RECOVERY METHOD AND APPARATUS FOR A PIPELINED PROCESSING UNIT OF A MULTIPROCESSOR SYSTEM

[75] Inventors: George J. Barlow, Tewksbury, Mass.; James W. Keeley, Nashua, N.H.; Richard A. Lemay, Carlisle, Mass.; Jian-Kuo Shen, Belmont, Mass.; Robert V. Ledoux, deceased, late of Litchfield, N.H. by Frances A. Ledoux, executrix; Thomas F. Joyce, Westford, Mass.; Richard P. Kelly, Nashua, N.H.; Robert C. Miller, Braintree, Mass.

[73] Assignee: Bull HN Information Systems Inc., Billerica, Mass.

[21] Appl. No.: 593,458

[22] Filed: Oct. 5, 1990

[51] Int. Cl.$^5$ ............................................. G06F 11/00
[52] U.S. Cl. ...................................... 395/575; 371/12
[58] Field of Search ................... 395/575; 371/8.1, 9.1, 371/12, 13, 14, 16.5

[56] References Cited

U.S. PATENT DOCUMENTS 4,833,599 5/1989 Colwell et al. ...................... 364/200

OTHER PUBLICATIONS

Logic Design for Dynamic and Interactive Recovery by W. C. Carter, D. C. Jessep, A. B. Wadia, P. R. Schneider & W. G. Bouricius, IEEE Transactions on Computers, vol. C-20, No. 11, Nov. 1971, pp. 1300–1305.

*Primary Examiner*—Vincent P. Canney
*Attorney, Agent, or Firm*—Faith F. Driscoll; John S. Solakian

[57] ABSTRACT

The pipelined central processing system (CSS) units of a multiprocessor system are tightly coupled to connect in common to a system bus for sharing main memory and input/output controllers/devices. The CSS includes several circuit boards for the different VLSI circuit chip pipelined stages and associated control circuits in addition to the bus interface unit (BIU) circuits. Each board includes one or more unusual event (UEV) detector circuits for signaling when the behavior of a stage is abnormal. The UEV fault signals from each board are collected by the BIU board. When a UEV fault is detected, the BIU board circuits prevent any further communications with the system bus and broadcasts the UEV fault signal to the other boards causing the different pipelined stages to emulate the completion of the instructions within the pipeline thereby flushing it. It is thereafter placed in a nonpipelined mode. Control circuits execute a UEV handler microcode routine which reads the contents of syndrome registers included on each board containing the UEV indicator states in addition to error signals into register file working locations. The UEV signal is then cleared enabling the BIU to resume communications with the sytem bus.

18 Claims, 12 Drawing Sheets

ABM SYNDROME REGISTER 100-12

| BIT | DESCRIPTION | CATEGORY |
|---|---|---|
| 00 | SYSTEM BUS UNAVAILABLE RESOURCE (CSSUAR) | RED |
| 02 | DETECTED RED (BUS RED) | RED |
| 09 | SYSTEM BUS OPERATION TIMEOUT RED | RED |
| 11 | POWER FAILURE INTERRUPT TIMEOUT | RED |
| 13 | LOCK REQUEST ACK HISTORY (LOCK HIST) | RED |
| 14 | LOCK REQUEST ERROR (LOCKUEV) | RED |
| 29 | APM BUSY (PROCESSOR UNAVAILABLE) | RED |
| 30 | APM CONTROL STORE ERROR | RED |
|  |  |  |
|  |  |  |
|  |  |  |

Fig. 4a.

ACD SYNDROME REGISTER 60-12

| BIT | DESCRIPTION | CATEGORY |
|---|---|---|
| 02 | VMU RED (VMU UEV) | RED |
| 04 | E-CACHE RED (RETRY FAILED) | RED |
| 05 | E-CACHE YELLOW (RETRY SUCCESSFUL) | YELLOW |
|  |  |  |
|  |  |  |
|  |  |  |
|  |  |  |
|  |  |  |
|  |  |  |
|  |  |  |

Fig. 4b.

APM SYNDROME REGISTER 20-12

| BIT | DESCRIPTION | CATEGORY |
|---|---|---|
| 12 | UEV INTERRUPT | RED |
| 14 | I/A ADDRESS CONTROL STORE PARITY ERROR | RED |
| 15 | I/A DATA CONTROL STORE PARITY ERROR | RED |
| 16 | E/C ADDRESS CONTROL STORE PARITY ERROR | RED |
| 17 | E/C DATA CONTROL STORE PARITY ERROR | RED |
| 24 | I-CHIP INPUT PARITY ERROR | RED |
| 25 | A-CHIP INPUT PARITY ERROR | RED |
| 26 | E-CHIP INPUT PARITY ERROR | RED |
| 27 | C-CHIP INPUT PARITY ERROR | RED |
| 30 | UEV INTERRUPT HISTORY | |
| | | |

Fig. 4c.

P-BUS SYNDROME REGISTER 100-14

| BIT | DESCRIPTION | CATEGORY |
|---|---|---|
| 00 | P-BUS FILL COUNT (P BUS UEV) | RED |
| 01 | P-BUS DATA PARITY ERROR (BUS RED) | RED |
| 02 | P-BUS RED LEFT WORD (BUS RED) | RED |
| 03 | P-BUS RED RIGHT WORD (BUS RED) | RED |
| 16 | SYSTEM BUS CSS CHANNEL NUMBER MSB | |
| 17 | SYSTEM BUS CSS CHANNEL NUMBER LSB | |
| 18 | SYSTEM BUS RED LEFT WORD (BUS RED) | RED |
| 19 | SYSTEM BUS RED RIGHT WORD (BUS RED) | RED |
| 22 | AUXILIARY COMMAND ERROR (AUXUEV) | RED |
| 23 | CACHE COMMAND ERROR (CMDUEV) | RED |
| | | |

Fig. 4d.

RECOVERY METHOD AND APPARATUS FOR A PIPELINED PROCESSING UNIT OF A MULTIPROCESSOR SYSTEM

RELATED PATENT APPLICATIONS AND PATENTS

1. The patent application of Ming-Tzer Miu and Thomas F. Joyce entitled, "Production Line Method and Apparatus for High Performance Instruction Execution," filed on Dec. 19, 1988, bearing Ser. No. 07/286,580, now abandoned, which is assigned to the same assignee as this patent application.

2. The patent application of David E. Cushing, Romeo Kharileh, Jian-Kuo Shen and Ming-Tzer Miu entitled, "Dual Port Read/Write Register File Memory," filed on Dec. 19, 1988, bearing Ser. No. 07/286,552, issued as U.S. Pat. No. 4,933,909 on assignee as this patent application.

3. The patent application of Jian-Kuo Shen, Richard P. Kelly, Robert V. Ledoux and Deborah K. Staplin entitled, "Control Store Addressing from Multiple Sources," filed on Dec. 19, 1988, bearing Ser. No. 07/286,578, which is assigned to the same assignee as this patent application.

4. The patent application of Richard P. Kelly, Jian-Kuo Shen, Robert V. Ledoux and Chester M. Nibby, Jr. entitled, "Control Store Double Pump Operation," filed on Dec. 19, 1988, bearing Ser. No. 07/286,581, issued as U.S. Pat. No. 4,916,601 on Apr. 10, 1990, which is assigned to the same assignee as this patent application.

5. The patent application of Richard P. Kelly and Robert V. Ledoux entitled, "Control Store Address Generator for Developing Unique Instruction Execution Starting Address," filed on Dec. 19, 1988, bearing Ser. No. 07/286,582, now abandoned which is assigned to the same assignee as this application.

6. The patent application of David E. Cushing, Richard P. Kelly, Robert V. Ledoux and Jian-Kuo Shen entitled, "Mechanism for Automatically Updating Multiple Unit Register File Memories in Successive Cycles for a Pipelined Processing System," filed on Dec. 19, 1988, bearing Ser. No. 07/286,551, issued as U.S. Pat. No. 4,980,819 on Dec. 25, 1990 which is assigned to the same assignee as this application now U.S. Pat. No. 4,980,819.

7. The patent application of Richard P. Kelly and Robert V. Ledoux entitled, "Automatic Data Steering Mechanism for Alignment of Operands into and out of an Execution Unit," filed on Mar. 31, 1989, bearing Ser. No. 07/331,991, which is assigned to the same assignee as this application.

8. The patent application of Robert V. Ledoux, Richard P. Kelly and Forrest M. Phillips entitled, "Ring Reduction Logic Mechanism," filed on Mar. 31, 1989, bearing Ser. No. 07/332,258, issued as U.S. Pat. No. 5,117,491 on May 26, 1992 which is assigned to the same assignee as this application now U.S. Pat. No. 5,117,491.

9. The patent application of Deborah K. Staplin, Jian-Kuo Shen and Ming-Tzer Miu entitled, "Resource Conflict Detection Method and Apparatus Included in a Pipelined Processing Unit," filed on Jun. 30, 1989, bearing Ser. No. 07/374,882, issued as U.S. Pat. No. 5,073,855 on Dec. 17, 1991 which is assigned to the same assignee as this application now U.S. Pat. No. 5,073,885.

10. The patent application of Deborah K. Staplin and Jian-Kuo Shen entitled, "Instruction Unit Logic Management Apparatus Included in a Pipelined Processing Unit," filed on Jun. 30, 1989, bearing Ser. No. 07/374,881, which is assigned to the same assignee as this application.

11. The patent application of Forrest M. Phillips entitled, "Least Recently Used Replacement Level Generating Apparatus," filed on Sep. 1, 1989, bearing Ser. No. 07/402,192, issued as U.S. Pat. No. 5,125,085 on Jun. 23, 1992 which is assigned to the same assignee as this application, now U.S. Pat. No. 5,125,085.

12. The patent application of Thomas F. Joyce, Ming-Tzer Miu and Richard P. Kelly entitled, "Apparatus and Method for Increased Operand Availability in a Data Processing Unit with a Store Through Cache Memory Unit Strategy," filed on Jan. 5, 1989, bearing Ser. No. 07/294,529, issued as U.S. Pat. No. 5,123,097 on Jun. 6, 1992 which is assigned to the same assignee as this application now U.S. Pat. No. 5,123,097.

13. The patent application of Thomas F. Joyce, Robert C. Miller and Marc Vogt entitled, "Apparatus and Method for Data Group Coherency in a Tightly Coupled Data Processing System," filed on Jan. 5, 1989, bearing Ser. No. 07/294,534, which is assigned to the same assignee as this application.

14. The patent application of Forrest M. Phillips, Thomas F. Joyce and Ming-Tzer Miu entitled, "Apparatus and Method for Address Translation of Non-Aligned Double Word Virtual Addresses," filed on Jan. 5, 1989, bearing Ser. No. 07/294,528, issued as U.S. Pat. No. 5,051,894 on Sep. 24, 1991 which is assigned to the same assignee as this application now U.S. Pat. No. 5,051,894.

BACKGROUND OF THE INVENTION

1. Field of Use

The present invention relates to data processing systems and more particularly to fault tolerant systems.

2. Prior Art

As data processing systems become entrusted with performing increasingly more critical tasks requiring high dependability, this increases the need for such systems to be fault tolerant. The goal of a fault tolerant design has been stated as one to improve dependability by enabling a system to perform its intended function in the presence of a given number of faults.

Fault tolerance in data processing systems has been achieved through redundancies in hardware, software, information and/or computations. A fault tolerance strategy is considered to include one or more of the following elements. It includes masking (dynamic correction of generated errors); detection of errors (symptoms of faults); containment (prevention of error propagation across defined boundaries; diagnosis (identification of the faulty module responsible for a detected error; repair/reconfiguration (elimination or replacement of a faulty component or a mechanism for bypassing it); and system recovery (correction of the system to a state acceptable for continued operation.

Recovery is defined as the continuation of system operation with data integrity after an error or fault occurs. Some consider dynamic recovery essential to a fault tolerant data processing system if information integrity is to be preserved as a consequence of minimum error propagation.

Dynamic recovery has employed the use of self testing and dynamically checked logic circuits, most specifically in the form of interface error checkers. Implementation of dynamic hardware retry has been used to overcome the effects of transient hardware faults transparently to the rest of the system.

One approach in implementing dynamic recovery has involved the use of a recovery control unit (RCU). The RCU is used to analyze error signals, sometimes to perform rapid hardware diagnosis and sometimes to initiate interrupts for additional program aid such as diagnostics. As such, the RCU provides the basis for dynamic interaction between hardware and software for recovery. This approach is described in greater detail in the article entitled "Logic Design for Dynamic Interactive Recovery" by W. C. Carter, et al., published in the November, 1971 issue of IEEE Transactions on Computers, Vol. C-20, No. 11, pages 1300–1305.

There have been rapid changes in computer architectures, with increased integration in VLSI devices and extensive use of pipelining techniques. These have resulted in significantly more complex designs involving the use of VLSI customized chips in implementing the different pipelined stages of a processing unit which execute several instructions in parallel at high speed.

This complexity and speed have made it exceedingly difficult to implement a fault tolerance strategy because of difficulties in defining interface boundaries and in the detection of faults without the introduction of substantial duplication of hardware.

Faults are generally classified in terms of their duration, nature and extent. The duration of a fault can be transient, intermittent or permanent. A transient fault often, the result of external disturbances exists for a finite length of time and is non recurring. A system with an intermittent fault oscillates between faulty and fault-free operation which usually results from marginal or unstable (metastable) device operation. Permanent or so-called "hard" faults are device conditions that do not change or correct with time. They result from component failures, physical damage or design errors. It has been observed that intermittent faults (so-called soft faults) typically occur with greater frequency than "hard" faults. Such faults are more difficult to detect, since they may disappear after producing errors.

As mentioned, all of the above discussed changes in computer architectures make it very difficult to implement recovery strategies for various types of faults without adding to design complexity. These difficulties are further compounded in the case of tightly coupled multiprocessor systems containing several VLSI processing units particularly when these units are microprogrammed or firmware controlled. One such multiprocessor system responds to certain errors, such as firmware parity errors or shadow chip miscomparison errors by causing the processing unit to come to a halt. This approach has provided little or no opportunity for the software to recover. Further, halting the processor in such instances could result in the system being placed in an unrecoverable state.

For further information regarding fault classifications and certain commercial computers incorporating fault tolerance strategies, reference may be made to the articles entitled "Fault-Tolerant Computing: Fundamental Concepts," by Victor P. Nelson and "Fault Tolerance in Commercial Computers," by Daniel P. Siewiorek, published in the July, 1990 issue of "Computer" published by IEEE.

Accordingly, it is a primary object of the present invention to provide a method and apparatus for carrying out a fault tolerance strategy which does not increase the complexity of a computer architecture.

It is a more specific object of the present invention to provide a method and apparatus for enabling reliable recovery from faults occurring within the stages of a pipelined data processing unit subsystem of a multiprocessor system.

SUMMARY OF THE INVENTION

The above and other objects of the present invention are achieved by the incorporation of the present invention method and apparatus into a production or pipelined central processing subsystem (CSS) unit such as the type of system which is subject of the related patent application of Ming-Tzer Miu and Thomas F. Joyce entitled, "Production Line Method and Apparatus for High Performance Instruction Execution." The CSS unit is one processor of a closely coupled multiprocessor system in which the CSS unit connects in common to a system bus for sharing main memory and input/output resources such as peripheral, communications and input/output controllers/devices.

Each CSS unit includes a plurality of VLSI chip circuit stages, some of which share common firmware controlled elements. As described in the related patent application, the CSS unit includes a central processing unit (CPU), a virtual memory unit (VMU), and a cache unit. The cache unit connects to the system bus through a bus interface unit (BIU). The CPU includes an instruction unit stage (I Unit), an address unit stage (A Unit), and a number of parallel execution unit stages (E Unit, C Unit). The cache unit includes an instruction cache (I Cache) and a data cache (E Cache).

The I Unit, A Unit and E Unit stages are constructed from custom VLSI chip circuits and occupy a first circuit board (mother board). The VMU, I Cache, and E Cache circuits occupy another circuit board (daughter board).

The BIU interface circuits form part of the circuits of a second mother board. According to the teachings of the present invention, the BIU board also includes special registers and control circuits used to respond to certain types of unusual event (UEV) signals indicating that a fault was detected and for initiating certain actions to preserve the integrity of system data.

In accordance with the teachings of the present invention, each circuit board includes one or more UEV detector circuits designed to detect when the pipeline stage associated therewith is exhibiting abnormal behavior. The phrase "abnormal behavior" refers to the performance of operations by a stage which do not make sense in terms of the functions normally performed by such stage.

For example, these detector circuits are capable of detecting abnormal behavior conditions such as an assumption of an unusual machine state which does not make sense in terms of the input signals being applied, the sending or receiving of an improper sequence of commands in which there is an attempt to perform an operations which is inconsistent with a previously performed operation or an attempt to access a firmware control store location which is inconsistent with normal operation.

The UEV detector circuits provide an early opportunity for detecting behavioral symptoms indicative of when the CSS unit is acting abnormally or improperly. Since in such cases it becomes unwise to continue instruction execution, the CSS unit is caused to stop operating in a pipelined mode and is made to switch to a nonpipelined mode allowing the firmware controlled CPU to establish control of the CSS unit.

In greater detail, when an UEV fault is detected by any one of the three circuit boards, an UEV fault signal is sent to the BIU control circuits. This causes the BIU control circuits to immediately stop further communications with the system bus by stopping the issuance of any further system bus requests. This action preserves the integrity of the system data by preventing contamination of such data by the misbehaving CSS unit. Also, the BIU broadcasts the CSS UEV fault signal to all of the CSS stages. This broadcasted signal causes the pipelined stages to emulate completion of all of the instructions within the pipeline so as to flush it out.

For example, all memory write operations/commands are permitted to flow down to the point in the CSS unit where they are received by the BIU. In response to such requests, the BIU generates a ready signal to the requesting stage indicating that the operation was performed without actually writing the data into memory. Also, the cache unit stage will convert all cache misses into hits enabling the stages to complete their outstanding operations with what is believed to be valid data.

Once the pipeline is emptied and the I Unit has completed fetching the last instruction, the E Unit assumes control of the CSS unit. In greater detail, the firmware control store unit of the E Unit includes a UEV microcode firmware handler routine which is branched to by the E Unit. This routine writes into a group of A unit register file working register locations, the contents of the syndrome registers included within each circuit board. It writes into a last working location in the group indications for indicating whether or not it was an external or internal UEV and if internal, whether it was a firmware or hardware UEV. In the case of a firmware UEV, the firmware address which produced the UEV is also written into the working location.

Additionally, it writes the contents of the same working locations into main memory. In greater detail, in response to the UEV condition, the firmware trap handler routine causes all of the syndrome register contents to be written into a specially allocated extension area of the normal trap save area which is the area normally reserved for storing context information. This enables the operating system to preserve the hardware and firmware behavioral information, in addition to other status information for further analysis.

The syndrome registers include the UEV fault indicators in addition to key error conditions which further define the nature of the environment when the fault occurred. The UEV handler routine causes the clearing of a BIU UEV interrupt indicator enabling it to resume communications with the system bus. The UEV handler routine also causes a unique trap to be constructed which indicates if the detected fault was internal or external to the CSS unit. The generation of the trap is based upon an analysis of different bits within certain syndrome registers, in addition to other context information.

In the absence of another UEV fault having occurred indicative of a "hard" fault condition, the UEV handler routine enables the I Unit to load its address counter to fetch the first instruction of the trap handler software and the pipeline is able to resume instruction execution.

In accordance with the teachings of the present invention, the extensive information provided concerning hardware and firmware behavior through the use of UEV detector circuits and error indicator information enable the operating system software to make its own determination as to whether or not it agrees with the hardware that the fault was "soft" or transient in nature and does not jeopardize the overall integrity of the system. That is, the operating system from its perspective is able to reliably determine if the system still is trustworthy.

It also assesses if the victim task (i.e., the task which was running during the occurrence of the UEV condition) was a critical systems task or a user task running a critical system function such as where it was running and failed when it was manipulating a semaphore operation or holding a spin lock. When the trap handler software determines that the integrity of the operating system is in doubt even though the underlying hardware and firmware had signalled that it is trustworthy, the software causes the system to switch to a high priority processing level.

Based upon whether the trap was external or internal, the operating system software captures different information which is forwarded to a technical assistance (service) center (TAC) where further analysis can be performed. Where the trap signaled an internal CSS fault, the operating system forwards syndrome register contents stored in the extended trap save area to the TAC where it is written into an error log. The operating system software will continue operating and will terminate the task which was running at the time of the internal trap condition. The invention's use of separate syndrome registers within each circuit board facilitates the TAC's identification of the optimum replaceable unit (ORU) or circuit board which produced the UEV fault.

The methodology of the present invention makes it possible for the system to recover from transient or soft faults in a reliable fashion. It also provides for the detection of faults through the collection of unusual event signals from detector circuits distributed within the different circuit boards of the CSS unit which are sensitive to deviations in normal operational behavior by the pipelined stages. The UEV detector circuits within the BIU are able to detect abnormal behavior involving system bus operations or any other buses to which the CSS unit is required to connect.

Also, the UEV detector circuits within the CPU stages are provided for signaling abnormal behavior occurring within the firmware control elements. Additionally, the special BIU registers of the preferred embodiment stores system bus address information pertaining to the last physical address presented to the system bus as well as the address pertaining to a last lock memory operation.

Thus, with little additional circuits for detection and collection of UEV fault information, and a small amount of additional firmware, the CSS unit is able to provide the necessary information needed for reliable recovery based upon independent decisions made by both the hardware and firmware and software. The recovery process takes advantage of the fact that most faults are transient in nature and therefore will not render the system untrustworthy.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

BRIEF DESCRIPTION OF THE DRAWINGS

FIGS. 4a through 4d illustrate in greater detail, the syndrome registers of FIG. 2.

DESCRIPTION OF THE PREFERRED EMBODIMENT

Overall System

Figure 1:
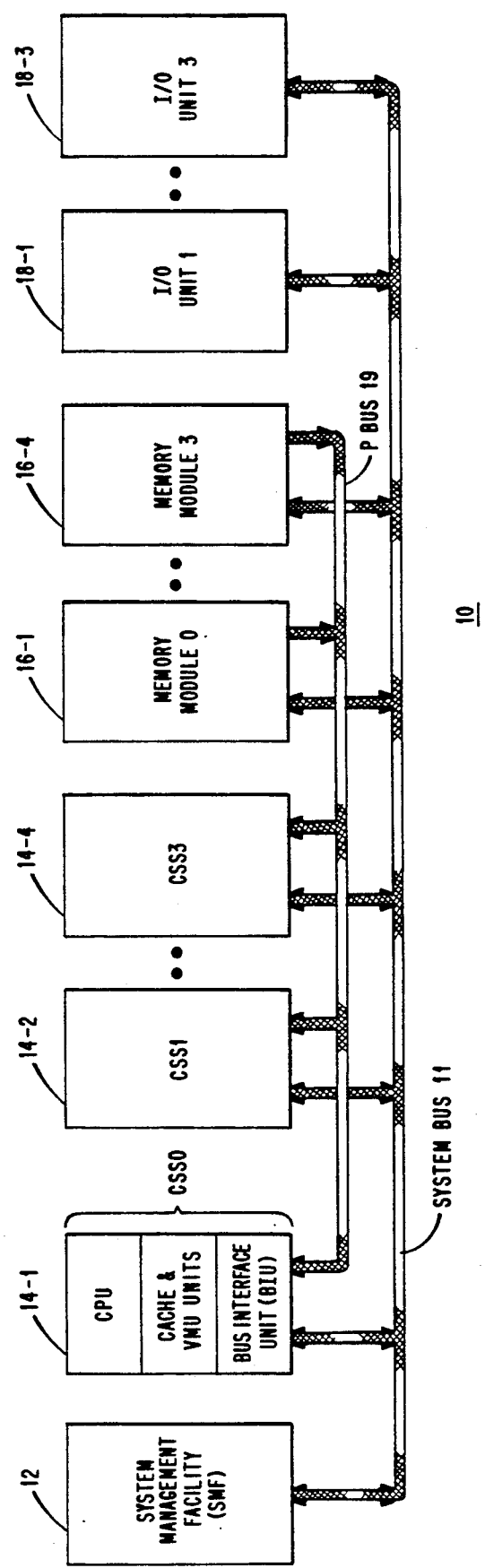
FIG. 1 is a block diagram of a multiprocessor system which incorporates the method and apparatus of the present invention.

FIG. 1 shows in block diagram form, a multiprocessor system 10 which incorporates the method and apparatus of the present invention. As shown, system 10 includes a system management facility (SMF) 12, a plurality of identical central subsystem (CSS) units 14-1 through 14-4, and a number of different subsystems 16 through 18 which are tightly coupled together by a system bus 11. The illustrative different subsystems include a number of memory subsystems 16-1 through 16-4 and a number of input/output subsystems 18-1 through 18-3. Additionally, the CSS units 14-1 through 14-4 and memory subsystems 16-1 through 16-4 connect in common to a unidirectional asynchronous processor (P) bus 19. Each subsystem includes an interface unit which enables the subsystem to transmit or receive requests in the form of commands, interrupts, data or responses/status to another subsystem on the system bus 11 in an asynchronous manner.

At the left end of bus 11, a termination network not shown defines the high priority end of bus 11. The SMF unit 12 which is positioned to the right of the termination network has the highest priority. Bus priority decreases as a function of each subsystem's distance from the termination network. The different subsystems communicate requests over system bus 11 on a priority basis defined by a distributed priority network included within system bus 11. For more detailed information regarding this arrangement, reference may be made to U.S. Pat. No. 4,724,519.

CSS Unit

Figure 2A:
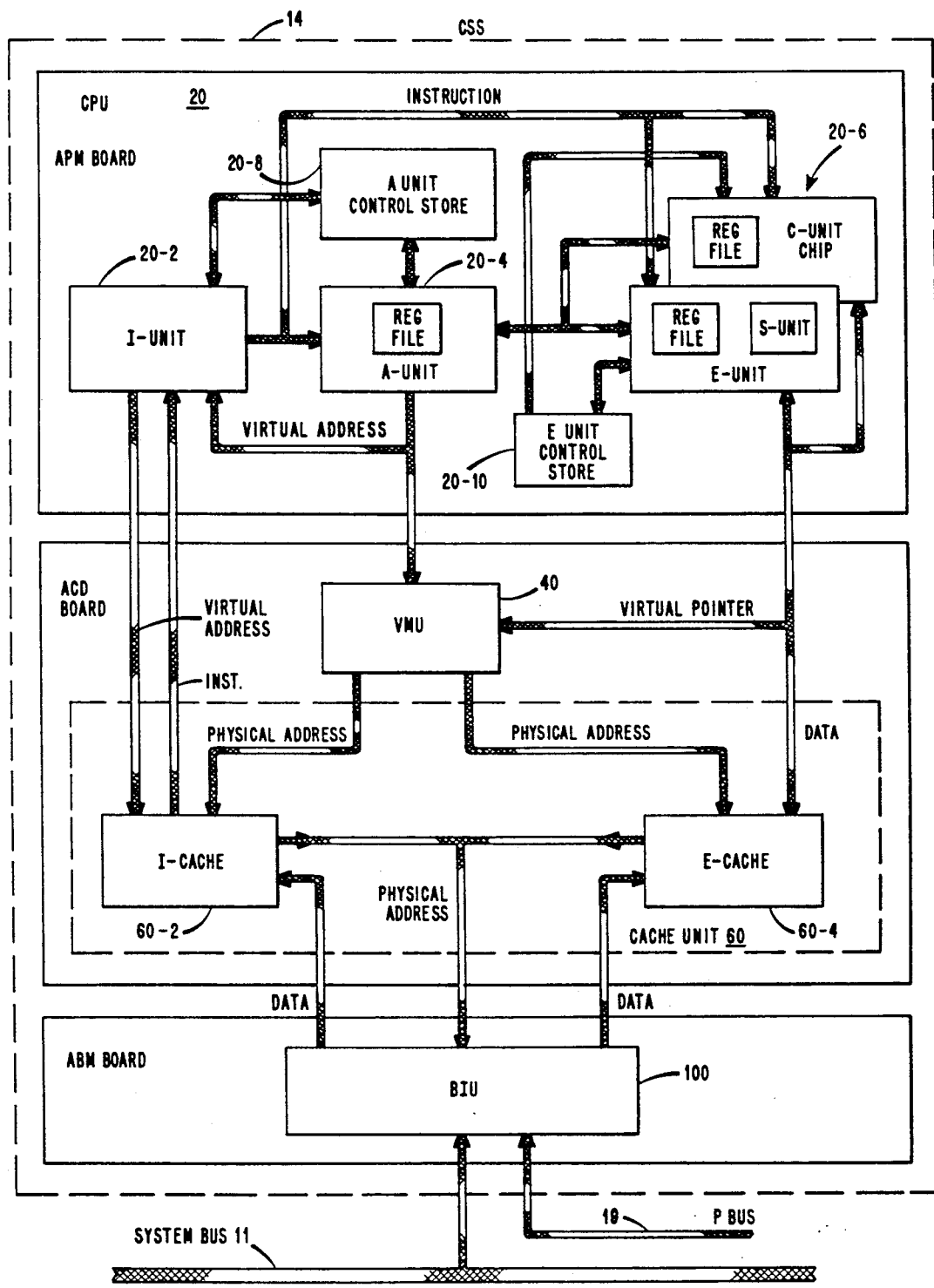
FIG. 2a is a block diagram of the central subsystem (CSS) unit of FIG. 1.

FIG. 2a shows in block diagram form, the central subsystem (CSS) unit 14 which takes the form of the production data processing system of the related patent application of Ming-Tzer Miu and Thomas F. Joyce. As shown, CSS unit 14 includes a central processing unit (CPU) 20, a virtual memory unit (VMU) 40 and a cache unit 60. The cache unit 60 couples to system bus 11 through a bus interface unit (BIU). The BIU 100 has four interfaces. It serves as an interface for CPU 20, VMU and cache unit stages, system bus 11 and processor (P) bus 19.

As shown, the main elements of CPU 20 include an instruction unit (I unit) stage 20-2, an address unit (A unit) stage 20-4 and an execution unit (E unit) stage 20-6. In the preferred embodiment, the execution unit stage 20-6 include a scientific unit (S-unit) and a commercial instruction processing unit (C-unit). The cache unit stage 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from the I-cache unit 60-2 and cracks or decodes these instructions to determine how the other units, namely the A-unit 20-4 and the E-unit 20-6 will further process those instructions. In addition, the I-unit 20-2 executes certain branch instructions which are then removed from the production line.

The A-unit 20-4 generates addresses from instructions it receives from the I-unit 20-2. Additionally, it executes certain types of instructions such as register-to register type instructions removing them from the production line. When the instruction is a type of instruction which is to be executed by E-unit 20-6, the A-unit 20-4 sends a virtual address to VMU 40 which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 60-2. The A-unit 20-4 will also confirm the execution of a branch instruction and send the branch address back to the I-unit 20-2 which will have already requested the next instruction from the I-cache unit 60-2 specified by the I-unit 20-2 prefetch branch address.

As seen from FIG. 2a, both the A-unit 20-4 and E-unit 20-6 include register files which store the contents of the registers which are programmer accessible. Also, both the I-cache unit 60-2 and E-cache unit 60-4 are updated with instructions and operands fetched from main memory via system bus 11 and BIU 100.

As shown in FIG. 2a, the I-unit stage 20-2 and A-unit stage 20-4 share a common firmware control store element 20-8. Similarly, E-unit and C-unit execution units 20-6 share another common firmware control store element 20-10.

The I-unit 20-2, A-unit 20-4 and E-unit 20-6 pipelined stages together with their control elements 20-8 and 20-10 occupy a mother circuit board. VMU stage 40 and cache unit stage 60 occupy a daughter board which plugs into the CPU mother board. The system bus and P bus interface circuits of BIU 100 occupy another mother board. Thus, the entire CSS unit requires two socket card positions within the system.

Production Line Mode of Operation

Instructions are executed in a production like fashion by the elements of CPU 20. That is, the I-unit 20-2 receives each instruction from I-cache stage 60-2, cracks it and then sends the instruction to the A-unit stage 20-4. The A-unit 20-4 either executes the instruction or sends the virtual address to VMU 40 for translation in order to fetch the required operands from E-cache stage 60-4 which are in turn sent to E-unit 20-6.

While the A-unit 20-4 is executing its portion of a first instruction received from I-unit 20-2, the I-unit 20-2 is fetching a second instruction and subsequent instructions from I-cache stage 60-2. When the A-unit 20-4 sends the virtual address specified by the first instruction to VMU 40 and notifies the I-unit 20-2 of that event, the I-unit 20-2 sends the second instruction to A-unit 20-4. The VMU 40 addresses E-cache stage 60-4 while the A-unit 20-4 is processing the second instruction introduced into the production pipeline. When the E-unit 20-6 is executing the first instruction, VMU 40 may be fetching operands from the E-cache stage 60-4 specified by the second instruction while the A-unit 20-4 is generating a virtual address for a third instruction. At the same time, the I-unit 20-2 is cracking a fourth instruction and fetching a next instruction. Thus, there could be five instructions progressing down the production line at a given instant of time.

However, since the I-unit 20-2 can execute certain branch instructions and the A-unit 20-4 can execute certain software visible register instructions, these instructions are removed from the production line as soon as the execution of these instructions are completed. Also, when the A-unit 20-4 is processing a branch instruction and the conditions of the branch are met, the A-unit 20-4 immediately confirms the branch address received from the I-unit 20-2 and the branch instruction is removed from the production line.

DESCRIPTION OF UEV DETECTOR AND SYNDROME REGISTER CIRCUITS

Figure 2B:
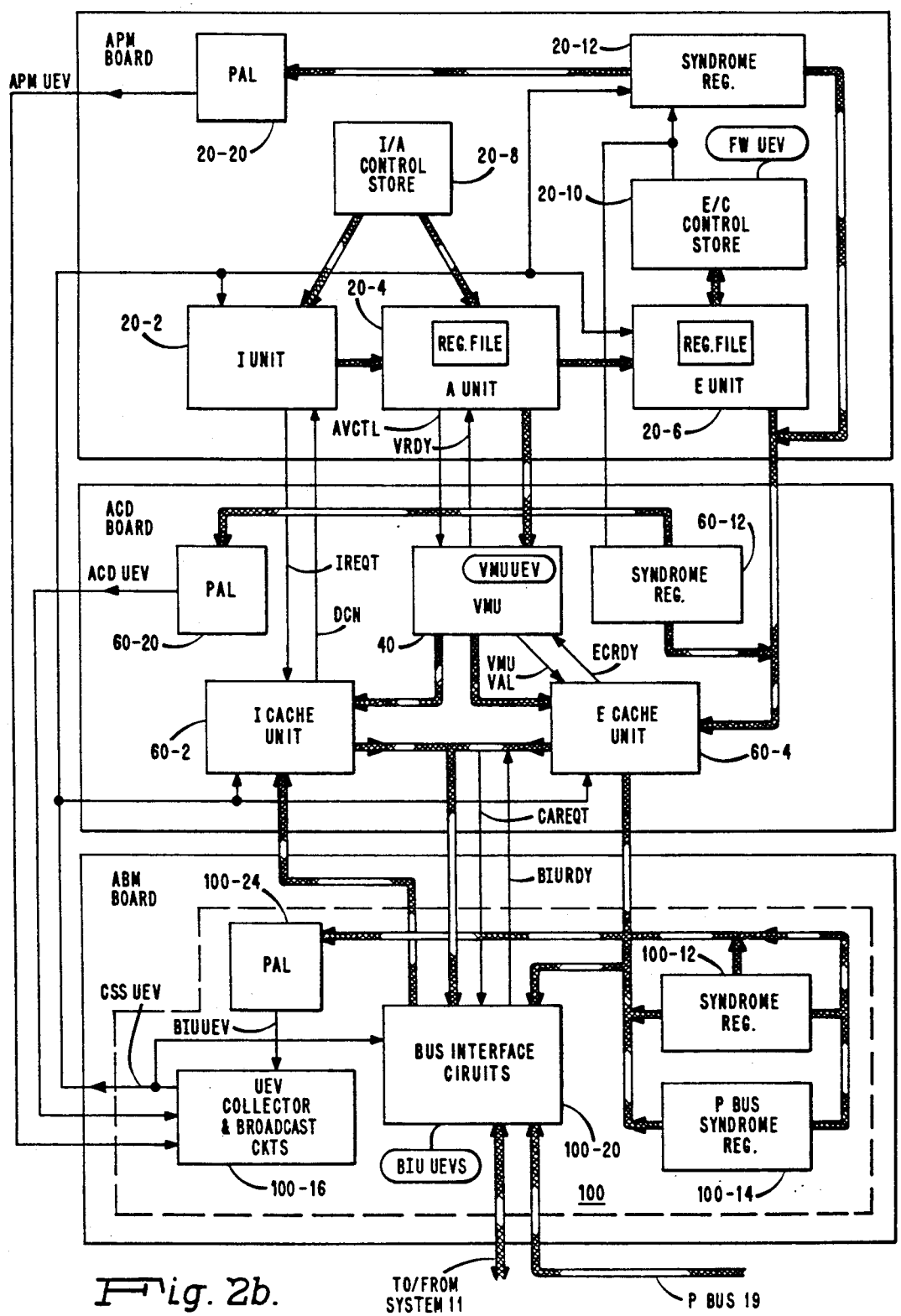
FIG. 2b is a block diagram of the CSS unit showing in greater detail, the apparatus of the present invention.

FIG. 2b shows the placement of different UEV detector circuits and syndrome registers within the APM, ACD, and ABM boards in accordance with the teachings of the present invention. FIG. 2a also shows some of the different interface signals between the different pipelined stages used to synchronize operations therebetween. Each of the boards includes at least one syndrome register which is connected to receive signals from the UEV detector circuits within the different stages included on the board. Additionally, some of the syndrome registers are also connected to store error signal indications and other status information which are useful in carrying out fault analysis.

As shown, the syndrome registers correspond to registers 20-12, 60-12 and 100-12 and 100-14. BIU 100 includes two syndrome registers, one for storing UEV indications and status information pertaining to the system bus 11 and another for storing UEV indications and status information pertaining to P bus 19. These signals are generated by the BIU bus interface circuits of block 100-20.

The syndrome registers connect to data paths through which their contents can be transferred and written into working register locations included within the register file memories of CPU 20 as described herein. This occurs in response to control signals (i e , readsyn) generated by the E-unit control store 20-10.

The APM, ACD and ABM boards include programmable array logic (PAL) circuits 20-20, 60-20 and 100-24. Each PAL ORs together, the UEV fault signals stored in the syndrome register(s) associated therewith to produce the UEV fault output signals APMUEV, ACDUEV and BIUUEV. As shown, these signals are applied as inputs to the UEV collector and broadcast circuits of a block 100-16 included within BIU 100. These circuits collect and combine all of the UEV signals from the boards to produce a resulting UEV fault signal CSS UEV indicating when one of the stages has detected a UEV condition. As shown, this signal is broadcasted to the circuits included within each of the boards, causing the stages to take the required action for ensuring system data integrity and reliable recovery as explained herein.

The different stages communicate through the use of interface request and ready signals which can be considered conventional for the purposes of the present invention. These signals include IREQT, DCN (I-unit/I-cache), AVCTL, VRDY (VMU/A-unit), ECRDY, VMUVAL (VMU/E-cache),and CAREQT, BIURDY (BIU/E-cache).

UEV Detector and BIU Circuits—FIGS. 3a through 3g

Figure 3A:
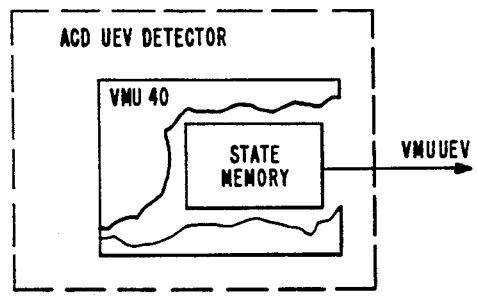
FIGS. 3a through 3f show in greater detail, the UEV detector circuits and BIU unit of FIG. 2.

FIGS. 3a through 3g show in greater detail, the UEV detector and BIU100 circuits constructed according to the teachings of the present invention. FIG. 3a shows in block diagram form, the UEV detector circuit included within VMU 40. This circuit is included as part of the state machine control of VMU 40.

More specifically, VMU 40 includes as part of its sequencing control, a state memory causes the generation of a VMU UEV signal when a bad state output signal is produced. This signal is generated when the specific combination of input signals forced the state memory to a location or state that does not make sense relative to the applied input signals. The VMU UEV signal indicates that the VMU 40 is misbehaving. For further information regarding the VMU state machine, reference may be made to the related patent application of Richard A. Lemay.

Figure 3B:
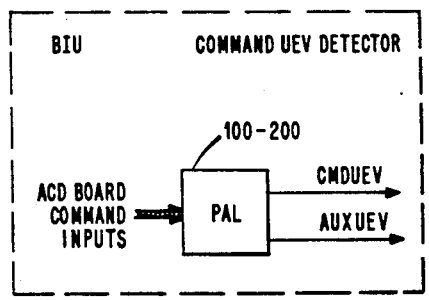

FIG. 3b shows in block diagram form, the circuits included in the ABM board which detect circumstances when the E-cache stage 60-4 is misbehaving and generate UEV signals. As shown, these circuits include a programmable logic array circuit (PAL) 100-200 which receives a plurality of interface signals which correspond to commands being issued by the E-cache stage. Based upon the states of these signals, PAL 100-200 generates a UEV signal CMDUEV when it detects having received an illegal combination of commands which could not be successfully completed. That is, these commands, if executed, would result in extraordinary behavior. This results in setting a particular bit position (i.e., bit 23) in the P bus syndrome register 100-14.

Also, PAL 100-200 of FIG. 3b receives command decode signals relating to illegal storage cycles being attempted by the E-cache stage. This involves the detection of when the cache stage is trying to execute a storage cycle and the write mask information furnished implies something which can not be translated onto the system bus in any meaningful way.

The above store cycle cases include the situation where the write mask information implies that no bytes are to be written, or the write mask implies that nonconsecutive bytes are to be written, or the write mask information implies non supported write operations (i.e. combinations of write commands that the memory will not execute). When any of these situations are detected, PAL 100-200 produces a UEV signal AUXUEV which results in the setting of another particular bit position (i.e., bit 22) within the P bus syndrome register 100-14 signaling a UEV fault condition.

Figure 3C:
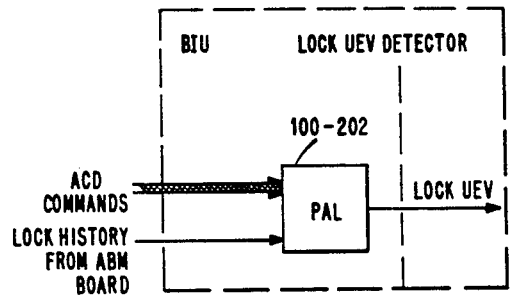

Another PAL 100-202, shown in FIG. 3c, is used to detect unusual event lock request sequences which result in the setting of another particular bit position of syndrome register 100-12 (i.e. bit 14). PAL 100-202 operates to generate the lock signal LOCKUEV in response to either signal LOCKER+OA or signal LOCKER+OB. Signal LOCKER+OA is generated by PAL 100-200 when a lock clear command is specified to be done by the E-cache stage and the memory lock history indicator flip-flop is not active or on. It is also generated when a lock set command is specified to be done by the E-cache stage and the memory lock history indicator flip-flop is already active or on.

The PAL 100-202 generates signal LOCKER+OB in response to auxiliary commands and checks for similar situations relative to the setting and clearing of the memory lock history indicator flip-flop. That is, it generates the LOCKUEV signal if the auxiliary command specifies a lock clear operation and the lock indicator flip-flop is already off or when the auxiliary command specifies a lock set operation and lock indicator flip-flop is already on.

Figure 3D:
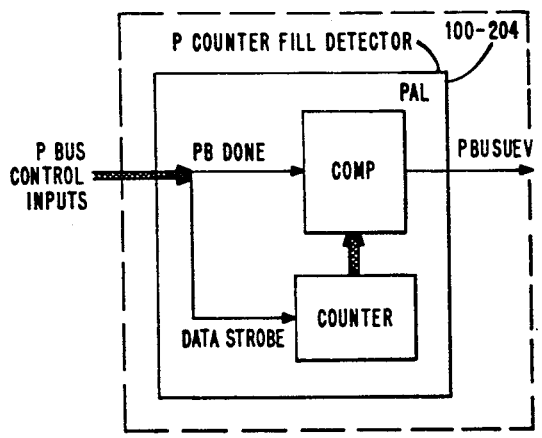

FIG. 3d shows the circuits of block 100-204 for detecting failures inside and outside BIU 100. These include lack of synchronization, noise spikes, missing strobes or counter failures. These conditions if not detected can lead to cache incoherency problems. The P bus 19 is a 32 bit wide bus which provides a burst of 8 data words in response to a command issued via system bus 11 to main memory. When memory has the 8 words, it makes the P bus 19 busy and transfers the words in sequence.

Along with the transmission of the last strobe, the memory sends a done signal. A PAL circuit 100-204 counts the data strobes and upon the receipt of the done signal verifies that the correct number of strobes have been received. If the count is other than that number, a UEV fault signal PBUSUEV is generated.

Figure 3E:
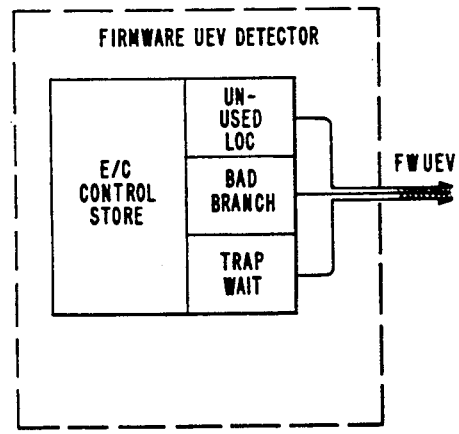

FIG. 3e shows in block diagram form, the types of firmware UEV fault detection that takes place in the control store 20-10. This enables the detection of lost interrupts, impossible branches or accessing unusual portions of the control store. When any one of these cases occur, the control store 20-10 is forced to a predetermined location which results in the generation of a UEV fault signal FWUEV. For further details regarding an arrangement for detecting firmware faults, reference may be made to the related copending patent application entitled, "Apparatus and Method for Detecting a Runaway Firmware Control Unit."

Figure 3F:
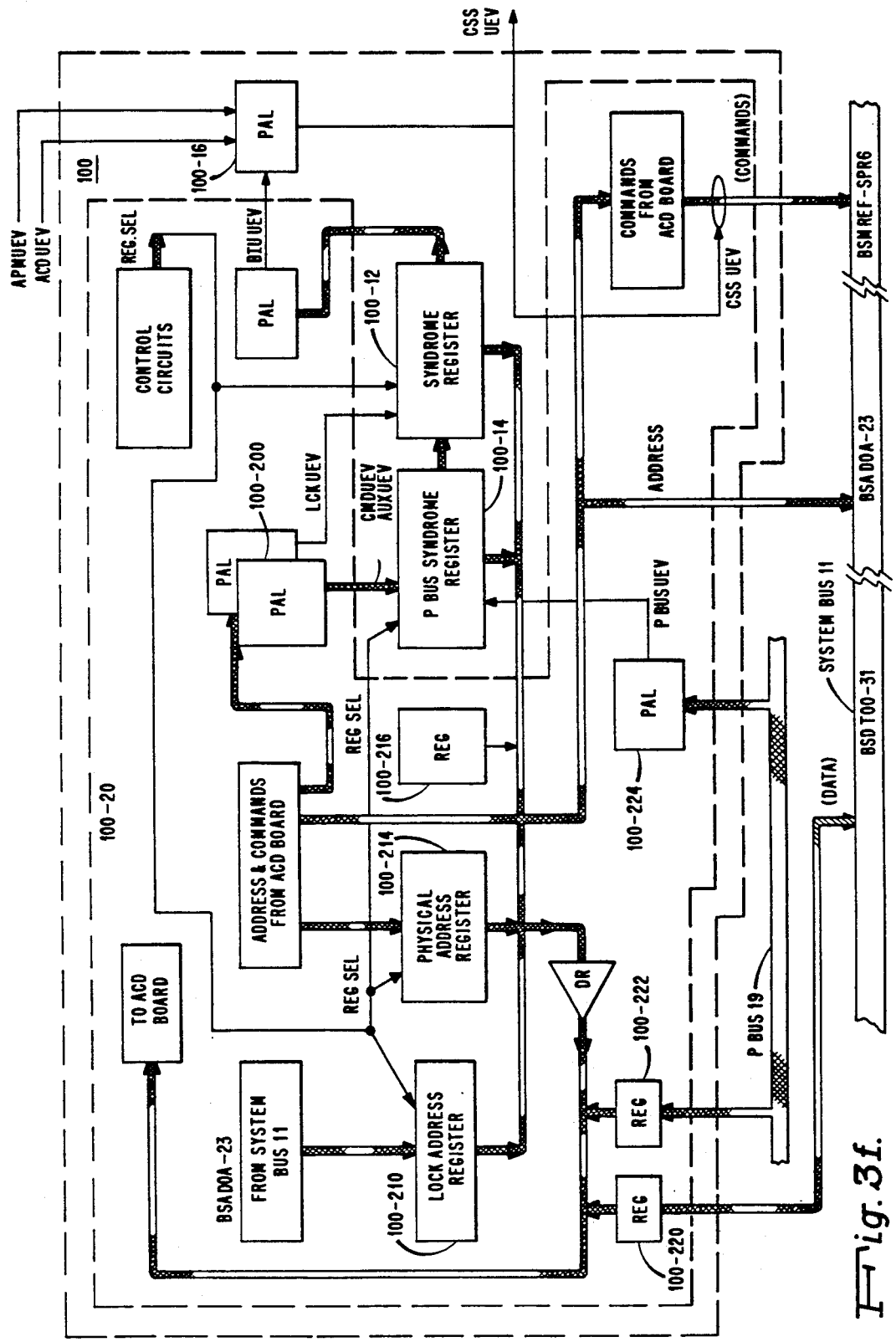

FIG. 3f shows in block diagram form, the circuits of BIU 100 in greater detail. Some of these circuits have been already described. In accordance with the present invention, BIU 100 further includes a number of new registers. These include a lock address register 100-210, a physical address register 100-214 and a single bit power fail register 100-216.

The lock address register 100-210 monitors the addresses being forwarded to the system bus 11 and saves the address associated with last lock operation performed by the CSS unit. The physical address register 100-214 is involved in the overall recovery process. If a failure occurs in the pipeline stages for any reason, the address contents of this register indicate to the software the last physical address or I/O channel number that was being used by the CSS unit in connection with accessing system bus 11.

The power fail register 100-216 contains a bit position which is set to an active or binary ONE state to indicate the occurrence of a UEV fault. This is done when a power failure condition is detected and a time-out signal occurs indicating that the CSS unit has not responded to the power fail condition within a millisecond time interval.

Syndrome Registers

FIGS. 4a through 4d show in greater detail the specific UEV and status information which is stored in the ABM, ACD, APM and P-BUS syndrome registers in accordance with the teachings of the present invention. As seen from FIG. 4a, the ABM syndrome register contains one or more different categories of signals. There are three different categories of signals and these are "red", "yellow" and "no category". The "red" designation indicates the occurrence of an uncorrectable error which include UEV faults. The "yellow" designation indicates the occurrence of an error which is not a UEV fault but which was correctable. The bits which have no category correspond to status information useful in fault isolation.

In greater detail, bit 0 corresponding to signal CSSUAR designates an unavailable resource was attempted to be accessed by the CSS unit. Bit 2 indicates the state of all detected and collected RED indications. Bit 9 signals a red system bus time-out of $\frac{1}{4}$ second. Bit 11 signals the occurrence of a power failure interrupt time-out. Bit 13 indicates when the memory lock as won by the CSS unit (signalled by an ACK).

Bit 14, corresponding to signal LOCKUEV, indicates the occurrence of an UEV fault relating to inconsistent commands having been detected by the circuits of FIG. 3c. Bit 29 is set when the CPU is unavailable denoted as APM busy. Bit 30 indicates when an error (parity) occurred in connection with the CPU control store on the APM board such as during the loading thereof or later during accessing.

FIG. 4b shows the allocation of bits within the ACD syndrome register. Bit 2, corresponding to signal VMU-UEV indicates when the circuits of FIG. 3a have detected that the VMU state machine has sequenced to an illogical state resulting in a UEV fault. Bits 4 and 5 designate the occurrence E-cache uncorrectable and correctable conditions based upon success of a retry operation.

FIG. 4c shows the allocation of bits within the APM syndrome register. Bit 12, corresponding to signal CSSUEV, indicates the occurrence of a UEV fault interrupt which is testable by the CSS unit firmware. Bits 14 through 17 indicate the detection of different stage parity errors. Bits 24 through 27 indicate occurrences of certain parity errors detected by checking circuits embedded within the different VLSI chips included within the I, A, C and E stages.

FIG. 4d shows the allocation of bits within the P-bus syndrome register. Bit 0, corresponding to PBUSUEV, indicates when the P-Bus circuits of FIG. 3d detect an UEV fault condition. Bits 1 through 3 indicate the detection of uncorrectable bus parity error conditions. Bits 16 and 17 designate the CSS unit channel number (CSS0-3) while bits 18 and 19 indicate the occurrence of uncorrectable errors.

Bits 22 and 23, corresponding to signals CMUEV and AUXUEV, denote when the circuits of FIG. 3b have detected unusual command sequences indicative of UEV fault conditions.

DESCRIPTION OF OPERATION

With reference to the flow diagrams of FIGS. 5a through 5e, the method and apparatus of the preferred embodiment of the present invention will now be described. As indicated previously, the present invention enables the recovery of a CSS unit in a reliable fashion, thereby improving the fault tolerance and resiliency of a multiprocessor system, such as the system of FIG. 1. In addition, it permits recovery only in those instances where the signalled fault is transient in nature or was due to operations external to the CSS unit.

Figure 5A:
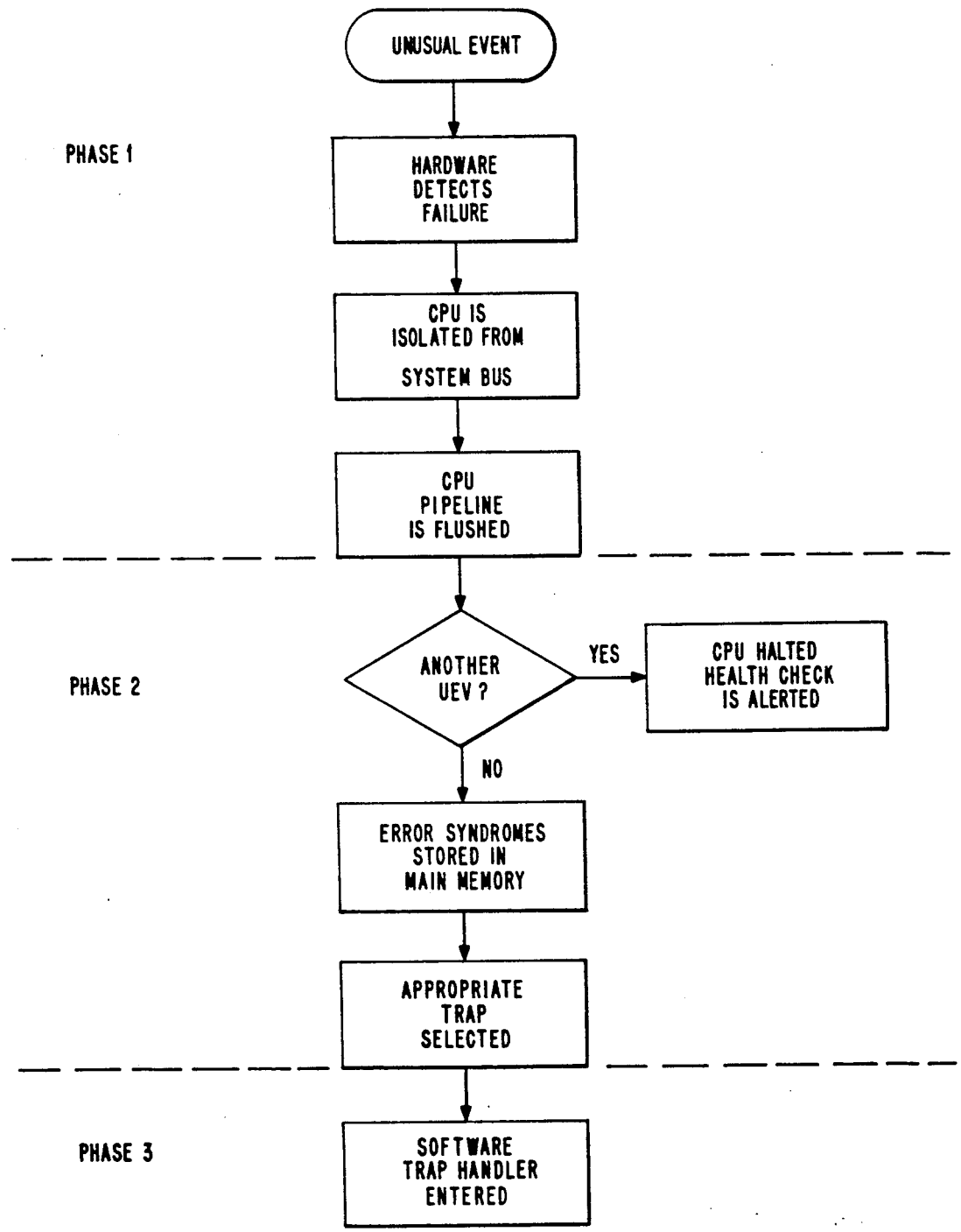
FIGS. 5a through 5e are flow diagrams used in explaining the operation of the present invention.

The flow chart of FIG. 5a illustrates the overall process carried out by the apparatus and method of the present invention. It is a three phase process. The first phase is viewed as a hardware phase in which a hardware recovery procedure is initiated by the CSS unit. The second phase can be viewed as a firmware phase which is performed by CSS unit firmware and the third phase is viewed as a software phase which is carried by the operating system software.

As indicated in FIG. 5a, during the first phase, the CSS unit is operating normally until one of the UEV detector circuits detects that one of the stages on one of the three boards is misbehaving. Most of the time, this will be caused by an intermittent or transient condition. When a UEV fault is detected by one of the UEV detector circuits, this causes a corresponding syndrome register bit position to be set. The syndrome register contents are monitored by one of the PAL circuits. When a change in state is detected, this causes the PAL to generate an output which results in one of the signals (APMUEV, ACDUEV or BIUUEV) being applied by one of the boards of FIG. 2b as an input to the collector and broadcast circuits of block 100-16.

This results in BIU 100 immediately broadcasting signal CSS UEV to all of the boards. The CSS UEV signal causes BIU 100 to stop immediately all further communications with system bus 11. As seen from FIG. 3g, signal CSS UEV inhibits commands from the ACD board from being applied to system bus 11. This ensures that the overall data integrity of the system is not contaminated.

Since the CSS UEV signal can be generated at any time during CSS unit operation, CPU 20 can have several instructions in process in the different pipelined stages. The CSS UEV signal allows the pipeline stages to be flushed. More specifically, the CSS UEV signal applied to the APM board causes the I-unit stage from starting any new instruction.

The I-unit finishes the then current instruction with I-cache faked data, even without hits. That is, the CSS UEV signal applied to the ACD board causes the I-cache stage to emulate responding to I-unit requests for data. It will pretend to fake data when necessary in addition to converting misses to hits and allow the I-unit to finish the current instruction.

The E-unit stage will also finish its current instructions of which there can be up to 4 instructions stored in the FIFO buffer which drives the pipeline inside the E-unit stage. The E-unit stage will receive faked data even without any hits. That is, signal CSS UEV causes the E-cache stage like the I-cache stage to furnish fake data when necessary in addition to converting misses to hits allowing the E-unit stage to finish executing its instructions.

The BIU 100 in the presence of the CSS UEV signal emulates transfers of memory bus requests during the interval in which communications to the system bus 11 are stopped. For example, in the case of any memory write requests it receives from the ACD board, it will generate a BIURDY signal indicating that the operation was done without actually writing data into memory.

It will be noted that the A and C unit stages do not respond to the UEV fault signal directly. That is, the I-unit stage is driven by the I firmware and in turn drives the I-cache stage. The E/C-unit stage is driven from the E firmware and E-cache stage. Hence, the A unit stage will operate as a slave and will have finished when the other stages are finished. The flushing of the pipeline stages essentially permits the CSS unit to switch from a pipelined mode of operation to a non-pipelined mode which allows control to be established by the firmware.

When the E-unit FIFO buffer becomes empty and the CSSUEV signal is set to an active state, the firmware branches to a predetermined location (#3100) which is the starting location of the UEV firmware handler routine contained in the E-unit control store. This begins the second phase of the process. The CSSUEV signal is stored as bit 12 of the APM syndrome register.

Figure 5B:
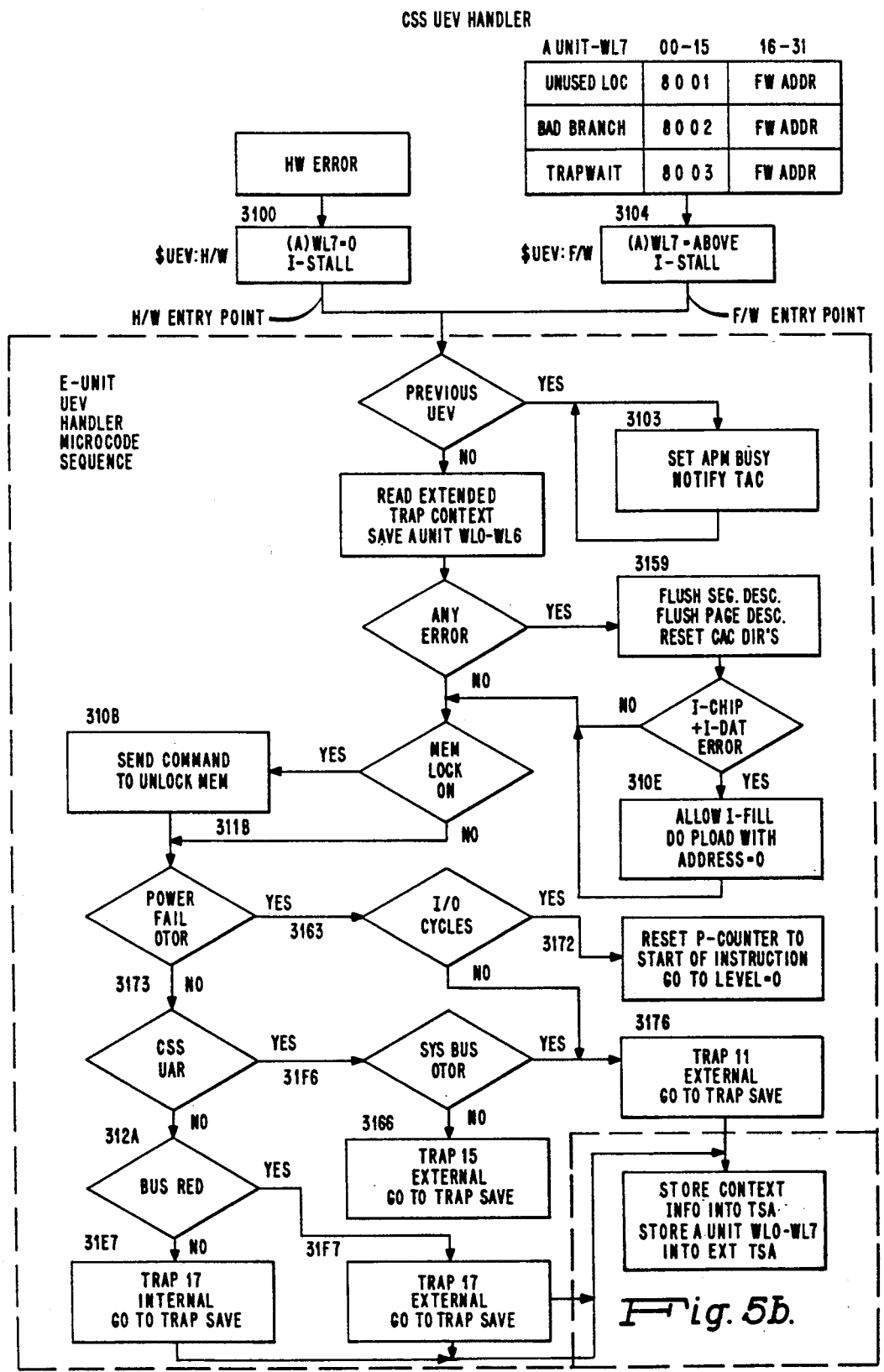

As shown in FIG. 5b, location 3100 is a hardware entry point. As mentioned, the control store firmware includes the mechanism of FIG. 3f for detecting the occurrence of any unusual situations indicating that the control store is misbehaving. Any such occurrence causes the control store to branch to location 3104 which is a second entry point into the UEV handler routine of FIG. 5b.

In either case, the first thing the UEV handler routine does is to determine whether or not it is the first time it received a UEV fault. It does this by testing the state of the previous UEV interrupt indicator corresponding to bit 30 of APM syndrome register 20-12. If the indicator is set, then the UEV routine resets bit 30 of the APM syndrome register 20-12 and then loops through location 3103 and sets an APM busy indicator corresponding to bit 29 of the ABM syndrome register 100-11. This indicator is testable by SMF 12 via system bus 12. This enables SMF 12 to perform a health check on the CSS unit for determining whether or not it should continue. Also, the CSS unit is stopped. This resetting of indicator bit 29 allows for possible recovery when the CSS unit that failed is reactivated (e.g. by SMF 12).

Since, in the present example, it is assumed that this is the first time through the sequence, the UEV handler routine causes the information contained in each of the syndrome registers to be readout in response to signal READSYN and written into corresponding A-unit working locations WL0 through WL6. Also, it writes into A-unit working location WL7, information for indicating whether or not it was an external or internal UEV fault and when internal, whether or not it was a hardware or firmware UEV. In the case of a firmware UEV, the firmware address in use at the time which produced the UEV is also written into working location WL7. In greater detail, if entry is from the hardware due to the detection of a hardware UEV, location WL7 of the A-unit register file is set to all ZEROS. This assumes that the execution of the firmware sequence will result in an external type of trap code being generated. If entry is from the firmware, due to the detection of one of several types of firmware UEVs, then location WL7 already will have been set to an "8" value which will result in an internal type of trap code being generated. Next, the UEV handler signals BIU 100 that it now has control of the system and that BIU 100 can now resume communications with system bus 11. This is accomplished by its resetting the UEV interrupt bit 12 of the APM syndrome register.

Next, the UEV handler routine based on the contents of certain syndrome registers constructs an appropriate trap for reporting the UEV fault to the operating system software. It provides one of four possible traps.

An external trap 15 code signals the operating system (trap handler software) that the CSS unit is unable to initiate an I/O or memory operation. This can be due to the fact that a bus retry operation was unsuccessful. For more details relative to the organization of system bus 11 and how retry operations are constructed, reference may be made to U.S. Pat. No. 4,764,862.

By contrast, an external trap 11 code signals the operating system that the CSS unit was unable to have an initiated I/O or memory operation completed. The external trap 17 code is used to indicate the detection of a bus related fault pertaining to system bus 11 or P bus 19. The internal trap 17 code is used to indicate the detection of an internal fault occurring within the CSS unit.

As shown, each trap results in the UEV handler calling a trap save firmware routine. The trap save firmware routine stores the required context information into the trap save area, including the trap member, and the contents of A-unit working locations WL0–WL7 into the extended trap save area as indicated in FIG. 5b. That is, the trap save firmware routine reads out the contents of various registers with the CSS unit 14 via system bus 11 into the trap save area in main memory depicted in FIG. 6. Also, it reads out the contents of the A-unit working locations WL0-7 via system bus 11 into an extended UEV trap save area in main memory depicted in FIG. 6. As shown, the contents of the lock address and physical address registers 100-210 and 10-214 of FIG. 3f are also read into the extended save area.

Now the above will be considered in greater detail. It is seen from FIG. 5b, that following the writing of the syndrome information into memory, the firmware UEV handler tests for any error. Specifically, it looks for any hardware error by examining the syndrome register bit contents for so-called red category bits. The presence of such bits indicates that the hardware in pretending to execute instructions placed itself in an indeterminate state. Therefore, in such situations, a firmware sequence starting at location 3159 is executed which flushes the segment descriptor, page descriptor random access memories within the VMU unit, in addition to clearing the I and E cache directories.

Next, the firmware UEV handler looks for the presence of any I chip errors or I data errors. These are special cases of errors within the VLSI chips indicating that the I chip is required to be placed in a known state. This causes the firmware UEV handler to execute the microinstruction in location 310E which fills the instruction buffer with instructions by performing a P load operation using an all ZEROS address.

Next, the firmware UEV handler tests the state of the memory lock indicator which corresponds to bit 13 of the ABM syndrome register. If it is set, then the system is in an indeterminate (hung) state. The state of the history indicator bit 13 indicates whether or not the memory lock is on. If the lock is on, the firmware UEV handler executes the microinstruction in location 310B which sends a memory command via system bus 11 to unlock the memory.

As seen from FIG. 5b, the firmware UEV handler next examines various syndrome bits for determining the type of trap code which is to be provided to the operating system. As a first level of checking, the handler determines whether or not a power failure time-out red fault occurred. This is determined by examining the state of bit 11 of the ABM syndrome register. If this bit is active or set to a binary ONE state, the handler next determines if the CSS unit was in the process of executing an I/O operation. This is ascertained by examining certain context information stored in the trap save area of memory. If an I/O operation was being performed, the handler executes the microinstruction stored in location 3172 which resets the I-unit P counter to the start of an instruction and signals a level 0 interrupt which is processed by the operating system as a normal power failure.

If an I/O operation was not being performed, the fault causes a trap 11 code to be generated. This causes the operating system to reference the context information stored in the normal trap save area as is done where the CSS unit tries to access an unavailable resource. In the absence of a power failure interrupt, the handler next determines if the CSS unit tried to access an unavailable resource. This is determined by examining the state of bit 0 of the ABM syndrome register. If bit 0 is in an active or binary ONE state, the handler next determines whether or not a system bus time-out occurred. This is determined by examining the state of bit 9 of the ABM syndrome register. If bit 9 is set to a binary ONE, the handler executes the microinstruction in location 3176, resulting in the generation of an external trap 11 code. When bit 9 is in a binary ZERO state, the handler executes the microinstruction in location 3166 which results in an external trap 15 code being generated.

If no power failure interrupt and no CSS UAR fault were detected, the handler next determines whether or not a bus red fault occurred. This is done by examining bits 0 through 3 and 18 and 19 of the P bus syndrome register. If any one of these bits is in an active or binary ONE state, the handler executes the microinstruction stored in location 31F7 which results in the generation of an external trap 17 code. However, if none of these bits are active, then the handler executes the microinstruction stored in location 31E7 which results in the generation of an internal trap 17 code.

At the time of generating the internal trap 17 code, the UEV handler sets the contents of working location WL0 to a binary code indicating the occurrence of the internal trap condition. That is, the most significant bits 0–3 are set to the value "8XXX" denoting the internal trap in the case of a hardware detected UEV fault entry. As explained, the firmware entry will already contain an 8XXX code as seen from FIG. 5b.

By performing an analysis of the different syndrome register bits, the UEV handler routine is able to construct a meaningful trap to report to the operating system. Also, all of the context information and UEV information will have been stored in the TSA and extended TSA portions of main memory. At this point, phase 3 is completed and the operating system trap handler routine is entered.

Figures 5C, 5D:
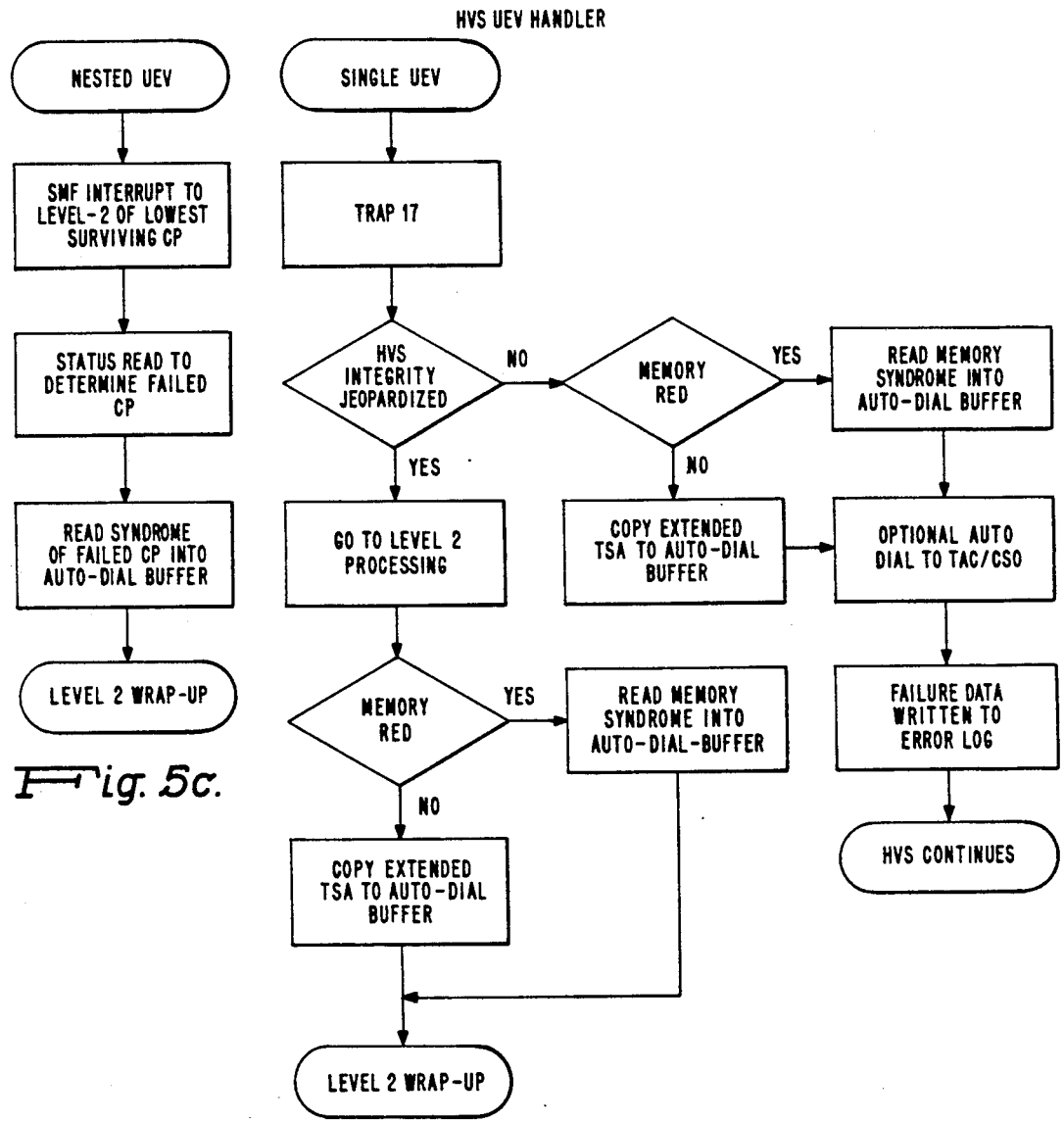
Figure 5E:
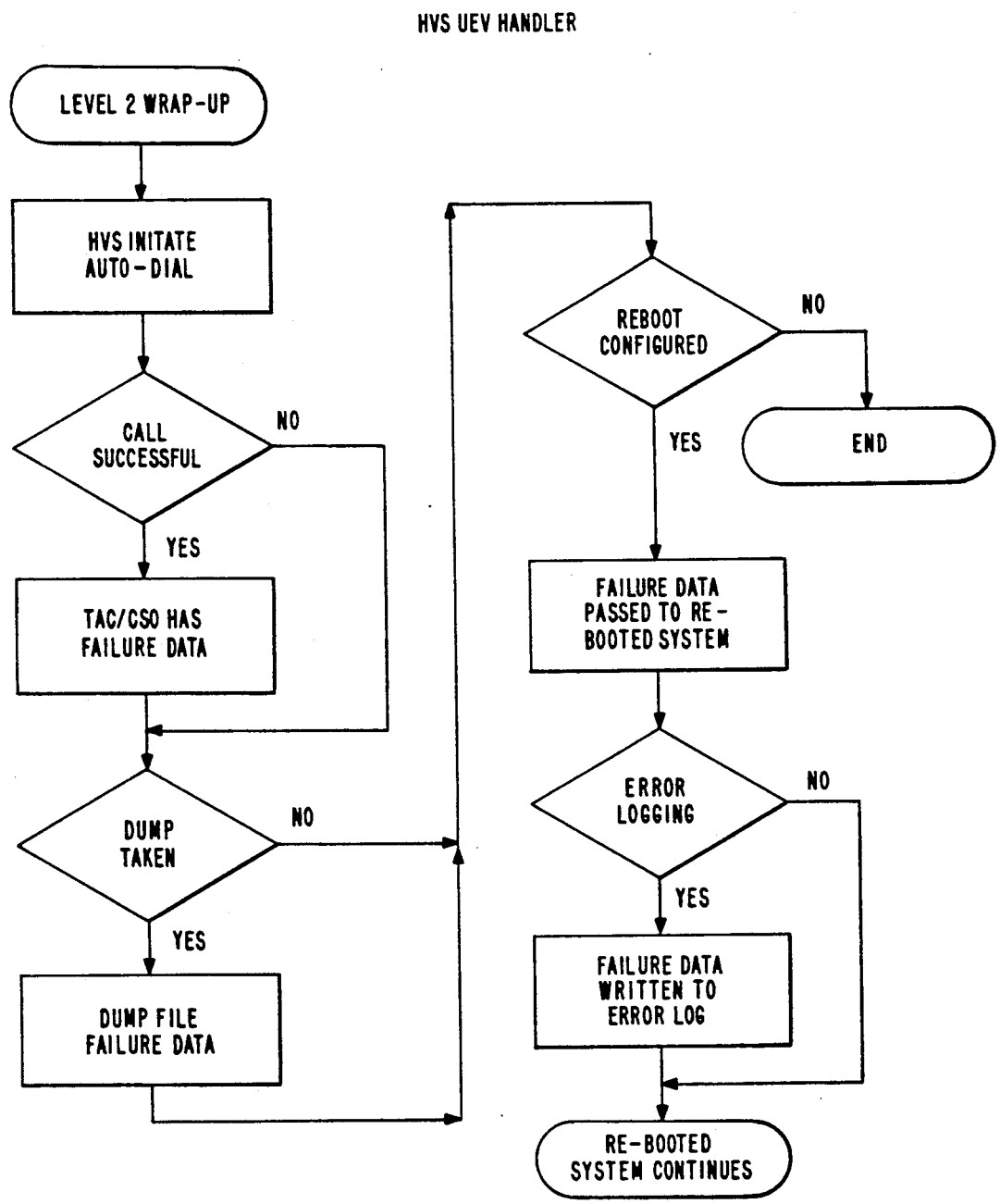

FIGS. 5c through 5e illustrate the sequence of operations performed by the operating system UEV trap handler. The operating system is trying to do two things with the UEV syndrome information stored by the CSS unit. First, the handler acts as a conduit of this information and sends the information via telephone to the TAC for evaluation and making informed decisions regarding the type of corrective action to be taken such as which ORU should be replaced. Secondly, the handler makes a determination as to whether it is able to continue or whether the software has been sufficiently compromised such that the operating system should not continue. That is, a hardware problem which the CSS unit may not consider fatal could be considered fatal by the operating system if, at the time, a critical activity was taking place when the hardware failure occurred.

The information transmitted to the TAC by the operating system includes certain baseline information which describes the hardware, firmware and software environment in which the problem/fault occurred. This information also includes the hardware system name for equating the problem to a specific customer site. This baseline information is collected in a conventional manner when the operating system first comes up and is available in the event of a fault. This information also allows the TAC to understand the specific environment in which the problem occurred which is extremely important to the supporting of many different versions of firmware and software. The information transmitted to the TAC is formatted in a standard way and includes two codes for specifying the overall nature of the problem and a time stamp.

Figure 6:
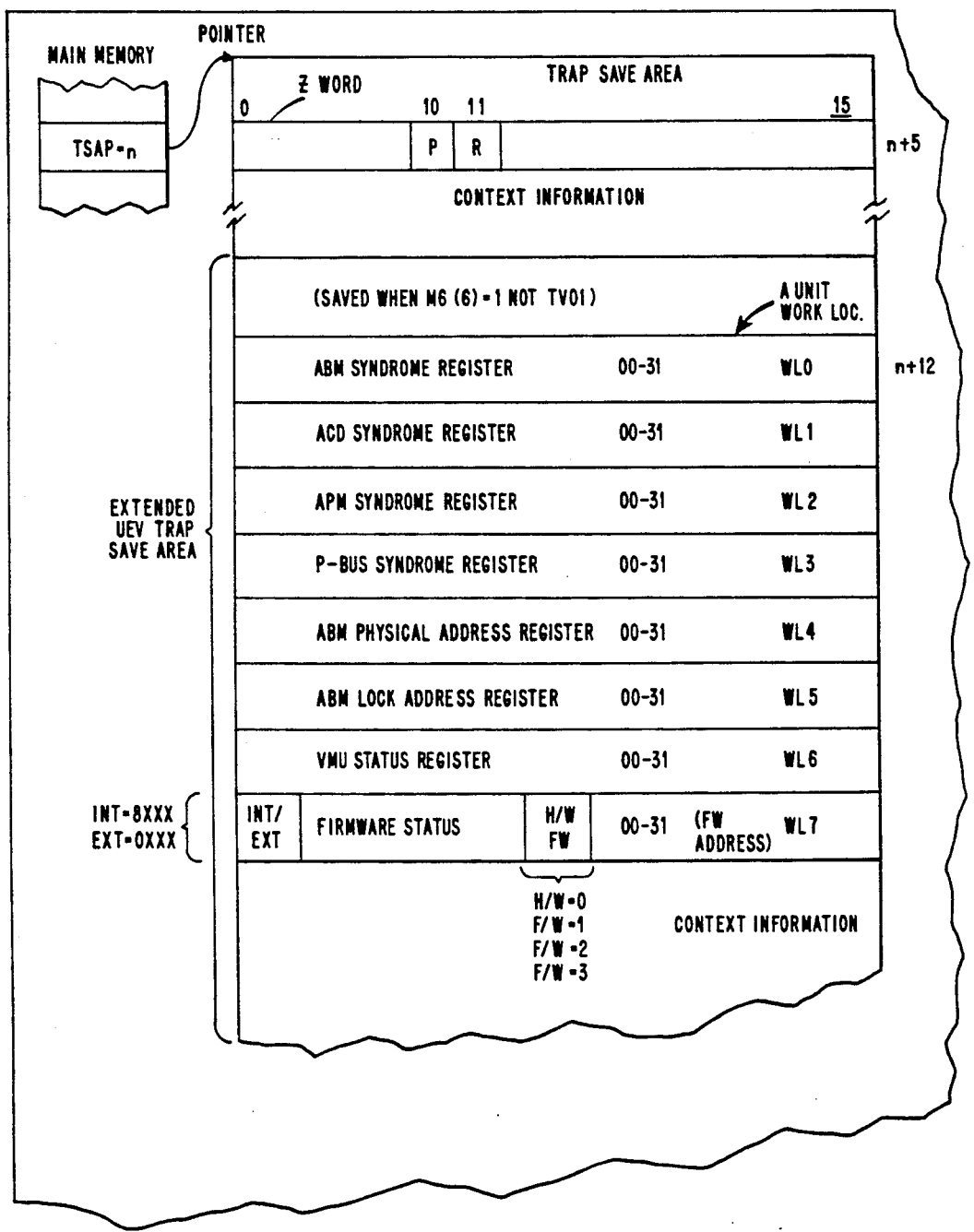
FIG. 6 shows the organization of memory areas according to the present invention.

In the case of UEV faults, the operating system as a function of the type of problem signaled by the firmware handler will retrieve the following information from the CSS unit and store it into a "free-form buffer." It stores the contents of the syndrome registers of the failed CSS unit, the memory red information contained in the syndrome registers, and the contents of the information contained in an extended trap save area (TSA) which include the CPU, firmware and address locations in use at the time of the UEV fault. This information is shown in FIG. 6.

When the CSS unit signals the occurrence of a UEV fault to the operating system, there are two basic paths taken to notify the operating system of the UEV fault. As shown in FIG. 5c, in the case where the CSS unit signals the occurrence of a UEV fault while a first UEV fault is being processed, the SMF 12 sends an interrupt to a surviving CSS unit of multiprocessor system 10 having the lowest channel number. This signals a "hard" hardware fault and the operating system proceeds to perform a level 2 wrap-up operation. In this situation, the operating system makes no decision as to the viability of the system, since the CSS unit has unconditionally indicated that the CSS unit has failed. The operating system treats the loss of the CSS unit as a reason for rebooting the system.

For a single UEV fault, as in the present example, the CSS unit firmware signals a trap 17 via the contents of working location WL7. This is treated as a transient or soft fault which the CSS unit could not correct in that one instance. The operating system treats this as a decision by the CSS unit that the system is not compromised from the hardware perspective, but takes action to determine whether or not the operating system has been compromised.

In so doing, the system operating determinates if the victim task was critical to the overall integrity of the operating system. If the task itself were a critical service task such as the page fault interrupt handler or if the task was not critical but the function it was performing when it was interrupted was critical and was left in an indeterminate state, then the operating system will examine the different syndrome bits for determining if recovery still can reliably proceed. If not, then it proceeds to the level 2 software wrap-up as in the case of FIG. 5c. For example, by examining the different firmware UEV indicators, it is possible to establish the presence of a memory problem which makes recovery unreliable. Also, the presence of a LOCKUEV indicator signals that the recovery procedure requires the issuance of a diagnostic instruction which resets or clears all memory locks prior to rebooting the system. On the other hand, the presence of a P-bus fill UEV fault indicates that recovery could reliably take place where the P counter clearly indicates the address of the instruction which was being executed when the fault occurred unless a recoverable (R) bit of Z word included within the TSA of FIG. 6 indicates that the instruction is non-recoverable.

In greater detail, pipelined processing units may not be capable of furnishing at trap time in the trap save area (TSA), instruction location information (i.e., a copy of the program (P) printer/counter and an instruction size (IS) field indicating in words up to the instant of trap detection which allows the operating system software to calculate the address of the instruction which cause a trap. Accordingly, an indicator is provided to enable the CSS subsystem unit to inform the operating system software about the validity status of the instruction location information. This indicator corresponds to the P bit 10 of a Z word located in the trap save area as shown in FIG. 6. At the time the trap is generated, the CSS subsystem unit, upon determining that the instruction information is invalid, sets the P indicator bit to an active or binary ONE state.

As mentioned, the Z word also includes the R indicator bit which corresponds to bit 11 of the Z word. At the time of the trap, the CSS subsystem unit sets this bit to an active or binary ONE state to indicate that it has executed one or more instructions beyond the instruction which caused the trap. In such cases, instruction recover would not be possible. Such instructions can be identified beforehand so as to enable the proper setting of the R indicator bit.

FIG. 5e shows the steps performed by the level 2 during wrap-up. The information associated with the UEV failure will be attempted to be transferred to the TAC. The same information will also be preserved in any dump taken and in the error log if the system is rebooted.

From the above, it is seen how the method and apparatus of the present invention is able to capture the syndrome information contents associated with an UEV fault and use that information effectively in determining whether or not the system is sufficient trustworthy to continue. The decision is a two step process which provides for the preservation of valuable hardware and firmware information which facilitates later fault diagnosis.

APPENDIX

The following is a brief description of the various control signals and corresponding logical equations for generating the pertinent signals of FIG. 2b, FIGS. 3a through 3g and FIGS. 4a through 4d.

| ABM SYN REG 100-12 |
| --- |
| ABM00 = CSSUAR = SYS BUS CYCLE TIMEOUT<br>    + SYS BUS OPERATION TIMEOUT |
| ABM02 = BUSRED = P BUS RED LEFT WORD<br>    + P BUS RED RIGHT WORD<br>    + SYS BUS RED LEFT WORD<br>    + SYS BUS RED RIGHT WORD |

-continued

```
ABM09 = SYS BUS OP. TIMEOUT
      = THE TOTAL TIME OF ALL CYCLES OF A CSS
        INITIATED SYS BUS OPERATION WAS EQUAL
        OR GREATER THAN 250 MSEC.
ABM11 = POWER FAILURE INT TIMEOUT
      = POWER FAILURE INT. MUST BE DONE
        WITHIN 1 MSEC.
ABM13 = LOCK REQUEST HISTORY.
        SET = SYS BUS ACK TO SET LOCK
              COMMAND
        RESET = SYS BUS ACK TO CLEAR LOCK
                COMMAND
ABM14 = LOCK REQUEST ERROR
      = LOCK REQUEST HISTORY & SET LOCK
        COMMAND
      + NO LOCK REQUEST HISTORY & CLEAR LOCK
        COMMAND
ABM29 = APM BUSY
      = CSS HAS NO FIRMWARE LOADED
      + CSS FIRMWARE DETECTED NESTED UEV
ABM30 = APM CONTROL STORE ERROR
      = I/A ADDR CONTROL STORE PARITY ERROR
      + DATA CONTROL STORE PARITY ERROR
      + E/C ADDR CONTROL STORE PARITY ERROR
      + E/C DATA CONTROL STORE PARITY ERROR
            ACD SYND REG 60-12
ACD02 = VMUUEV
      = VMU ILLEGAL STATE MACHINE STATE
ACD04 = E CACHE RED
      = E CACHE FAILED TO REPLACE LOCATION
        AFTER RETRY
ACD05 = E CACHE YELLOW
      = E CACHE REPLACED LOCATION AFTER RETRY
            APM SYND REG 20-12
APM12 = UEV INT (CSSUEV)
      = APMUEV + ACDUEV + BIUUEV
APM14 = I/A ADDR CONTROL STORE PARITY ERROR
APM15 = I/A DATA CONTROL STORE PARITY ERROR
APM16 = E/C ADDR CONTROL STORE PARITY ERROR
APM17 = E/C DATA CONTROL STORE PARITY ERROR
APM24 = I CHIP INPUT PARITY ERROR
APM25 = A CHIP INPUT PARITY ERROR
APM26 = E CHIP INPUT PARITY ERROR
APM77 = C CHIP INPUT PARITY ERROR
            P BUS SYND REG 100-14
P BUS 00 = P BUS FILL COUNT
         = P BUS DONE & COUNT = 8
         + NO P BUS DONE & COUNT = 8
P BUS 01 = P BUS DATA PARITY
P BUS 02 = P BUS RED LEFT
P BUS 03 = P BUS RED RIGHT
P BUS 16 = SYS BUS CSS CHAN NUM MOST SIGN
P BUS 17 = SYS BUS CSS CHAN NUM LEAST SIGN
P BUS 18 = SYS BUS RED LEFT
P BUS 19 = SYS BUS RED RIGHT
P BUS 22 = AUX COMMAND
P BUS 23 = CACHE COMMAND
LOCKER+ = ABM SYND BIT 14
        = LOCKER + 0A
        # LOCKER + 0B
    LOCKER+0A    (ABM12)
        = LOCKCLR & !LOCKRR (CACHE)
        # LOCKSET & LOCKRR (CACHE)
    LOCKER+0B    (ABM01)
        = AUX LOCKSET & LOCKRR
          AUX LOCKCLR & !LOCKRR
            ACD CACHE COMMAND ERROR
COMERR+ = "P" BUS SYND BIT 23 (ABM12)
        = IL CACHE CMD
          = ILL CMD BITS
          # ILL STORE CYCLE
    ILL CMD BITS
        = STORCY (MISSCY # LOCKSET)
        # LOCKCLR (LOCKSET # CRSBLK # !LOCKRR)
        # LOCKSET (LOCKRR # CRSBLK)
    IU STORE CYCLE
        = WRITE MASK IMPLIES NO BYTES
        # WRITE MASK IMPLIES NON-CONSECUTIVE BYTE
        # WRITE MASK IMPLIES NON-SUPPORTED WRITE
CAREQT  — Request from Caches for Bus Cycle
        = MISSCY
```

```
          (I or E Cache Miss - Request for fill)
        + STORCY
          (E Cache Memory Write Request)
        + LOCKSET
          (E Cache Set Memory Lock Request)
        + LOCKCLR
          (E Cache Clear Memory Lock Request)
        + ECBIU
          (E Cache to Bus Interface Other-Operation
           Request)
BIURDY  = CSSUEV = SYSTEM BUS CYCLE-OVER
IREQT   =  Instruction fetch request is sent by I-unit
           to I-cache.
DCN     — I Cache Data Coming Now Strobe
        = ICHIT3 & !SNOOPICY & !IFILL & !RDR11
          & !APMBUSY & HIT2U & HIT2L
          (I-Cache Hit — Strobes Valid Data into
           I-Unit)
        + BUEV
          (UEV - Force Data, valid or invalid, into
           I-Unit)
        ;
VRDY    — Virtual Memory Management Unit is Ready
          (SELect - State Machine Decode)
        = SEL:2
          (NOP)
        + SEL:3
        + SEL:4 & SEGOK & (MATCH0 # MATCH1) &
          !DBLHIT
        + SEL:6
        + SEL:8 & HOT0A
        + SEL:9 & !HOT0A
        + SEL:A
        + SEL:C & SEGOK & (MATCH0 # MATCH1) &
          !DBLHIT
        + SEL:D & SEGOK & (MATCH0 # MATCH1) &
          !DBLHIT &
          PDDAT20
        ;
AVCTL   = An 8-bit VMU control code which is by I-unit
          to the Virtual Memory Unit.
VMUVAL  — Virtual Memory Unit Valid Task to E-Cache
        = !FEMPTY & !VBIU
          (Task FIFO not Empty; Send Task From FIFO to
           E-Cache)
        + FEMPTY & TASK2E
          (Task FIFO Empty; Send Task Directly to E-Cache)
        ;
ECRDY.D @T3 — E-Cache Pipeline is Ready
        = !BLKSTRIP & ECHIT
          (E-Cache Hit, No Store in process to Block with
           hit)
        + !PASSOP & !SYNDOP & !RDOP & !WRTOP &
          !ECBIU
          (E-Cache is idle)
        + !CONFLICT & PASSOP & !WRTHOLD
          (E-Cache Address Pass Operation Completed)
        + ECSYCA & SYNDOP
          (E-Cache Syndrome Read Completed)
        + !CONFLICT & !RDOP & WRTOP & !WRTHOLD
          (E-Cache Write operation completed)
        + RDOP & BUEV
          (UEV, Force E-Cache Ready)
        + ECBIU & BIURDY & !WRTHOLD
          (E-Cache to Bus Interface Other-Operation
           Complete)
        ;
```

While in accordance with the provisions and statutes there has been illustrated and described the best form of the invention, certain changes may be made without departing from the spirit of the invention as set forth in the appended claims and that in some cases, ceratin features of the invention may be used to advantage without a corresponding use of other features.

What is claimed is:

1. A method for determining whether or not any one of a plurality of pipelined processing units which connect to a common system bus of a multiprocessor system running under a single operating system and each of which include a plurality of pipeline stages, is sufficiently trustworthy to recover from an error situation signaled through a trap operation, each pipelined processing units being constructed from a plurality of boards each of which define an optimum replaceable unit (ORU), said method comprising the steps of:

(a) including within each different ORU, an unusual event detector (UV) for determining when any of the stages contained on said ORU is not behaving properly;

(b) storing an indication of an unusual event having been detected by said UEV detector;

(c) collecting indications of said unusual events from each of said ORU's by one of said ORU's which provides an interface to said system bus;

(d) said one of said ORU's in response to a signal indicating the occurrence of an unusual event inhibiting any further transfer of requests by said processing unit to said system bus;

(e) broadcasting a signal to each of the remaining ORU's for causing the stages of said pipelined processing unit to emulate completion of all outstanding instructions contained within said plurality of pipeline stages for flushing said pipelined stages; and, (f) upon such completion, transferring control to one of the ORUs containing a firmware handler routine for further processing of said unusual event to enable signalling said operating system for determining if reliable recovery from said fault by one of said processing units is possible.

2. A system for facilitating recovery of a pipelined processing unit which connects to a system bus of a data processing system running under an operating system and each of which includes a plurality of pipeline stages and a bus interface unit for connecting said processing unit to communicate with said system bus, said system comprising:

a number of unusual event (UEV) detector circuits being included within predetermined ones of said pipeline stages and said bus interface unit for determining when corresponding ones of said stages and said bus interface unit are not behaving properly;

a plurality of syndrome registers, each syndrome register being associated with at least one of said stages and said interface unit for storing indications of unusual events having been detected by said UEV detector circuits;

first means included in said bus interface unit for collecting indications of said unusual events detected by said UEV detector circuits;

second means included in said bus interface unit connected to said first means which in response to a signal indicating the occurrence of an unusual event inhibiting any further transfer of requests by said processing unit to said system bus;

third means included in said bus interface unit connected to said second means for broadcasting a system UEV signal to each of said pipeline stages and said bus interface unit for causing the stages of said pipelined processing unit and bus interface unit to emulate completion of all outstanding instructions contained within said plurality of pipeline stages for flushing out said pipeline stages and processing of system bus requests respectively; and, a control element included in a predetermined one of said pipeline stages, said control element having a plurality of locations for storing firmware routines, one of said routines functioning as a handler routine, said control element being coupled to different ones of said stages and said bus interface unit and upon said completion transferring control to said firmware handler routine for further processing of said unusual event for determining if reliable recovery from said fault by said processing unit is possible.

3. The system of claim 2 wherein a first pipeline stage includes an instruction (I) unit for fetching, storing and decoding instructions received from memory; a second stage being coupled to said first stage and including virtual address generation means for generating virtual address signals defining locations in memory required for fetching operands specified by said instructions; a third stage coupled to said second stage and including means for translating said virtual address signals into physical address signals, a fourth stage coupled to said third stage for retrieving from memory, operands specified by said physical address signals and a fifth stage corresponding to said predetermined one of said pipeline stages, said fifth stage coupled to said first and fourth stages and further including execution means for executing certain ones of said instructions under control of said control element, and wherein different ones of said UEV detector circuits are included for detecting any unusual behavior in connection with the operations of said third, fourth and fifth pipeline stages.

4. The system of claim 3 wherein said execution means includes a first one of said UEV detector circuits associated with said control element for detecting unusual behavior to ensure that said I-unit, said second and fifth stages are operating properly in processing instructions.

5. The system of claim 3 wherein said virtual address generation means includes a second one of said UEV detector circuits for detecting unusual behavior for ensuring proper virtual to physical address translations.

6. The system of claim 3 wherein said fourth stage couples to said bus interface unit (BIU), said BIU further including a third one of said UEV detector circuits for detecting unusual behavior within interfaces between said fourth unit and BIU for ensuring that commands for manipulating memory resources are being properly generated before being provided to said systems bus.

7. The system of claim 6 wherein third UEV detector circuits included in said BIU detects when said fourth stage is attempting to change a lock within a memory resource in an inconsistent manner.

8. The system of claim 7 wherein said inconsistent manner corresponds to attempting to set said lock when already set or reset said lock when already reset.

9. The system of claim 7 wherein said BIU further includes a number of registers connected for storing address information during lock operations for facilitating recovery from transient faults.

10. The system of claim 3 wherein said fifth stage couples to said bus interface unit (BIU), said BIU further including a fourth one of said UEV detector circuits for detecting unusual behavior within interfaces between said fifth stage and BIU for ensuring that commands specifying store operations are being properly generated before being transferred to said bus.

11. The system of claim 3 wherein said bus interface unit couples to said system bus and further includes a fifth one of said UEV detector circuits for detecting unusual behavior associated with said system bus for ensuring that bus operations proceed properly.

12. The system of claim 11 wherein said system bus is asynchronously operated and wherein said fifth UEV detector circuit includes counter means for monitoring data transfer operations on said bus for signalling when a predetermined number of words has not been transferred during a data transfer operation.

13. The system of claim 1 wherein said one of said pipeline stages includes a register file memory and wherein said firmware handler routine includes a plurality of microinstructions, a first number of microinstructions for causing said control element to generate signals for reading out said indications into a plurality of working locations of said register file memory in response to having detected that said third means broadcasted a first system UEV signal.

14. The system of claim 13 wherein a second number of microinstructions for causing said control element to generate signals for constructing a trap code which distinguishes between external and internal faults for signalling whether a fault was external or internal to said pipelined processing unit for enabling said operating system to determine if recovery is possible by disabling said processing unit.

15. The system of claim 14 wherein said system includes a main memory coupled to said system bus, said control element further includes a trap save routine for causing said control element to generate signals for reading out said working locations into a predetermined trap save area of said memory for use by said operating system for determining if recovery is possible.

16. The system of claim 3 wherein said I-unit in response to said system UEV signal inhibits processing of any further instructions.

17. The system of claim 3 wherein said fourth stage in response to said system UEV signal generates signals for signalling that said operands specified by said physical address signals do not have to be fetched from memory and transferring said operands to said third stage.

18. The system of claim 3 wherein said bus interface unit in response to said system UEV signal generates signals for inhibiting transfer of system bus requests from memory until completion of said flushing out of said pipeline stages enabling said control element to gain control of said processing unit.

* * * * *